Patented Sept. 2, 1952

2,609,348

UNITED STATES PATENT OFFICE 2,609,348

SHORT-OIL ALKYD RESIN OF LOW ACID NUMBER AND METHODS OF PREPARING THE SAME

Robert N. Du Puis, Northbrook, Ill., and Howard J. Wright, Kaukauna, Wis., assignors to Association of American Soap & Glycerine Producers, Inc., a corporation of Delaware No Drawing. Application May 3, 1946, Serial No. 667,118

1 Claim. (Cl. 260—22)

This invention relates to an alkyd resin and methods of preparing the same, and more particularly to an alkyd resin of low acid number, low hydroxyl number, preferably of relatively low oil length, and characterized by the ability to form films which are very hard but which are relatively non-brittle.

In its preferred form, the invention comprises the use as one of the reactants in the resin formation of an inhibitor compound which is capable of reacting with the polybasic acid ingredient substantially to reduce gel formation by cross linkage. As a specific inhibitor compound may be used a derivative of an aliphatic hydroxy amino compound. Other types of inhibitors are described in the following specification.

Alkyd resins are prepared from polybasic acids, polyhydric alcohols, and fatty acids or oils. The fatty material serves the necessary purposes of increasing solubility and film flexibility, but at the same time the film hardness is decreased as the fatty content is increased. Moreover, in the usual methods of manufacturing alkyds, when the fatty content is reduced beyond a certain point, say 40% oil length in the case of glycerine resins, the resins have such a high acid number, even after cooking almost to the gel point, as to be incompatible with most pigments and are therefore of little practical utility. Attempts to prepare short oil-length alkyds by usual methods, therefore, result in soluble resins of high acid number, or, if it is attempted to continue the reaction to the point where a satisfactory acid number is obtained, in insoluble gels.

Two special methods are known for preparing satisfactory alkyds of short oil length and low acid number which still give hard films. One of these comprises the use of an unusually high excess of glycerine or other polyhydric alcohol, but this method increases the hydroxyl content of the finished resin to an undesirable degree. The other special method is to extract certain materials of high oil content from a regular alkyd by the use of an aliphatic alcohol as described by Wright and Du Puis in Industrial and Engineering Chemistry, 36, 1004 (1944) and in other references. This procedure leaves an alcohol-insoluble residue which is of short oil length and low acid number, but the process involved may be difficult or uneconomical for some resin manufacturers to carry out.

The fundamental cause of the inability to make a short oil resin of low acid number is believed to be related to the tendency of a dibasic acid like phthalic acid and a tri- or tetra-hydric alcohol like glycerine or pentaerythritol to form an insoluble gel when allowed to react at elevated temperatures. Such gel formation is characteristic of a reaction in which one reactant has at least two reactive groups and the other has more than two reactive groups. When the reaction mixture is diluted with a third reactant which has one or at the most two reactive groups, or if the reactivity of the reactant with more than two reactive groups is reduced in some other way, the formation of a gel is retarded. Thus, the more fatty acid radicals (greater oil length) in an alkyd, the less tendency to gel (i. e., the resins can be cooked to a lower acid number while still remaining soluble). Moreover, by replacing say glycerine with a mono- or dihydric alcohol the gelling tendency is also reduced.

It is theoretically possible to reduce the gelling tendency without reducing hardness, but until now no practical method of effecting this result has been known. By the use of our invention, however, it is possible to prepare an alkyd resin of any oil length and acid number by the simple procedure of including in the resin formula one of the inhibitor compounds described below. The result is that within the practical limits set by the fundamental nature of alkyds themselves, a resin of practically any hardness and acid number can be prepared. This is particularly important in the case of resins made with alcohols having more than three hydroxyl groups.

The industrial importance of this invention is substantial, for it allows the production of acceptable alkyd resin films harder than were heretofore considered possible, or allows the use of milder film-curing conditions. The potential saving in investment in baking equipment, shortened baking time and reduced processing time is very great. It is even possible in some instances to attain a desired film hardness by air drying which heretofore required baking, in about the same elapsed time.

The preferred form of new resin is produced by the introduction into the reaction mass, either as such or as a chemical derivative, of a relatively small proportion of an inhibitor substance of which the following are typical but not limiting examples: monoglycerylamine, glyceryl diamine, glyceryl phthalimide, glyceryl diphthalimide, glyceryl succinimide, glyceryl disuccinimide, monoethanolamine, 2-methyl-2-amino-1, 3 propanediol, glyceryl-beta-naphthyl ether, glyceryl monophenyl ether, glyceryl monochlorphenyl ether, or a hydroxyalkyl amide of a long chain fatty acid.

An extensive series of inhibitor-containing alkyds and related resinous materials has been prepared and tested. Information was obtained on the effect of varying: the percent replacement of dibasic acid by inhibitor; fatty acid content; inhibitor compound used; dibasic acid used; and type of fatty acids as the source of fatty modifier. Rosin derivatives of hydroxy amines have been prepared and characterized.

A preferred inhibitor for use in making the new alkyd resins of this invention is glyceryl monophthalimide.

The most satisfactory method found for the preparation of glyceryl phthalimide was the reaction between phthalic anhydride and glyceryl amine:

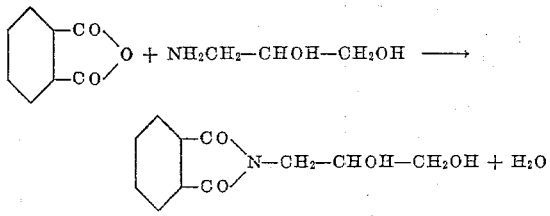

One mole of glyceryl amine and one mole of phthalic anhydride are slowly heated in an oil bath with stirring in an atmosphere of nitrogen. When the reaction starts the oil bath is removed until the initial reaction, which is very exothermic, subsides. Heating is then continued until the temperature reaches 150° C. The mixture is held at this temperature until water ceases to evolve.

The crude products obtained were pale yellow crystalline materials which on recrystallization from appropriate solvents became white solids of very well-defined crystalline structure.

A similar procedure was used in preparing the phthalimides of glyceryl α,γ-diamine and monoethanolamine. The physical constants of these materials are as follows:

| Phthalimide of | Crystallized from | Per cent N | | Melting Point, ° C. | |
|---|---|---|---|---|---|
| | | Found | Theory | Found | Literature |
| Glycerol α-monoamine | H₂O or methanol | 6.17 | 6.33 | 115–6 | New compound. |
| Glycerol α,γ-diamine | Methanol | 7.89 | 8.00 | 209 | 203–205. |
| Monoethanolamine | H₂O | 7.15 | 7.33 | 127–8 | 126–7. |

The data on a series of twelve alkyds of 20 to 35% oil length (50.3 to 62% phthalic anhydride) made both with no glyceryl phthalimide and with varying amounts of glyceryl phthalimide are given in Table I–A. These data give a comparison between the characteristics of standard short-oil alkyds and alkyds of the same oil length containing glyceryl phthalimide.

Since the manner of formulating alkyds seems to vary and since terminology may be easily confused, the actual amounts of reactants which were used in preparing the resins are given in the table. The method of calculation used in formulating the resin batches is given in a later section of this specification. The alkyds were made using soybean fatty acids. All reactants were placed in the flask at the start of the heating period. The mass was brought to 180° C. in one hour and to 235° C. in the next hour, and held in the latter temperature until the desired cure time was reached as determined on a Thermoelectric Company cure plate at 200° C.

It is apparent from the data in the table that the acid number of a resin may be reduced to practically any value depending on the amount of phthalic anhydride introduced as glyceryl monophthalimide.

*Table I–A Alkyd derivatives of glyceryl phthalimide*

| Resin No. | 1 | 2 | 3 | 4 | 5 | 6 | 7 | 8 | 9 | 10 | 11 | 12 |
|---|---|---|---|---|---|---|---|---|---|---|---|---|
| Percent oil length | 35 | 35 | 35 | 30 | 30 | 30 | 25 | 25 | 25 | 20 | 20 | 20 |
| Reactants (gms.): | | | | | | | | | | | | |
| Phthalic anhydride | 100.6 | 95.6 | 90.6 | 108.4 | 95.4 | 86.8 | 116.2 | 103.5 | 95.3 | 124 | 103.9 | 93 |
| Soy fatty acids | 67 | 67 | 67 | 57.4 | 57.4 | 57.4 | 47.8 | 47.8 | 47.8 | 38.3 | 38.3 | 38.3 |
| Glyceryl monophthalimide | 0 | 7.4 | 14.9 | 0 | 19.4 | 32.4 | 0 | 18.8 | 31.2 | 0 | 30.1 | 46.3 |
| Glycerine [1] | 59.3 | 54.8 | 50.7 | 61.1 | 50.4 | 43.2 | 63.3 | 52.8 | 46.0 | 65.5 | 45.6 | 39.8 |
| Percent Phthalic anhydride | 50.3 | 50.3 | 50.3 | 54.2 | 54.2 | 54.2 | 58.1 | 58.1 | 58.1 | 62 | 62 | 62 |
| Percent of the phthalic added as phthalimide | 0 | 5 | 10 | 0 | 12 | 20 | 0 | 10.7 | 18 | 0 | 16.2 | 25 |
| Acid Number: | | | | | | | | | | | | |
| Observed | 17.8 | 13.8 | 9.2 | 32.7 | 14.3 | 5.6 | 38.5 | 15.7 | 18 | 50.2 | 21.9 | 10.1 |
| Calculated [2] | 21.2 | 12.2 | 3.2 | 35.5 | 12.0 | −3.7 | 51.2 | 28.4 | 13.4 | 66.6 | 30.2 | 10.6 |
| Hydroxyl Number (uncorrected) | 93.0 | 89.1 | 84.7 | 96.3 | 87.9 | 81.8 | 87.4 | 98.0 | 83.0 | 79.8 | 79.3 | 83.0 |
| Hydroxyl Number as percent glycerine | 5.0 | 4.8 | 4.6 | 5.2 | 4.8 | 4.5 | 4.8 | 5.4 | 4.5 | 4.3 | 4.3 | 4.5 |
| Cure time at 200° C. (sec.) | 14 | 13 | 15 | 20 | 15 | 20 | | 13 | 18 | 28 | 13 | 15 |

[1] All resins contain 5 percent excess glycerine based on the weight of the finished product.
[2] For method of calculation, see a later section of this specification.

The films described in Table I–B were prepared from the resins of Table I–A. They were cast in duplicate with a Bird film applicator on glass plates except those used in the brittleness tests, which were cast on 30 gauge tin plate. After baking or air drying the films were stored at the indicated relative humidity for 24 hours before taking the reported Sward hardness readings. Film hardness at high humidity has been found to be roughly proportional to water resistance. The thickness of the films was determined by cutting a 0.5 cm. square out of the film in the center of the plate and measuring the thickness all around this square with an Ames Upright Gauge No. 13 with No. 100 Indicator.

over a ⅛ inch mandrel within a period of 2 seconds. Any sign of a pattern at the bend, as seen through a 6× magnifying glass, was taken as an indication of brittleness. Since this is a

*Table I-B.—Film tests*

| Resin No. | 1 | 2 | 3 | 4 | 5 | 6 | 7 | 8 | 9 | 10 | 11 | 12 |
|---|---|---|---|---|---|---|---|---|---|---|---|---|
| Percent oil length | 35 | 35 | 35 | 30 | 30 | 30 | 25 | 25 | 25 | 20 | 20 | 20 |
| Percent Phthalic added as phthalimide | 0 | 5 | 10 | 0 | 12 | 20 | 0 | 10.7 | 18 | 0 | 16.2 | 25 |
| Films Baked 1 hr. at 155° C.:[1] | | | | | | | | | | | | |
| Sward hardness[2] at approx. rel. hum. of: | | | | | | | | | | | | |
| 0 | 50 | 55 | 57 | 55 | 67 | 52 | 60 | 60 | 57 | 64 | 76 | 73 |
| 50 | 37 | 51 | 34 | 54 | 52 | 50 | 50 | 56 | 51 | 62 | 69 | 70 |
| 100 | 29 | 48 | 34 | 38 | 40 | 30 | 33 | 33 | 40 | 46 | 53 | 57 |
| Brittle[3] | no | no | no | no | yes | yes | yes | yes | yes | yes | yes | yes |
| Air Dry Films; 0.65% Pb, 0.05% Co on Solids Basis:[1] | | | | | | | | | | | | |
| Dust-free time, min.[4] | 20 | 10 | 18 | 5 | 15 | 15 | 7 | 14 | 10 | 6 | 12 | 15 |
| Tack-free time, min.[5] | 30 | 20 | 27 | 15 | 25 | 20 | 20 | 35 | 20 | 13 | 23 | 15 |
| Sward hardness[2] at approx. rel. hum. of: | | | | | | | | | | | | |
| 0 | 15 | 30 | 25 | 18 | 28 | 22 | 15 | 29 | 26 | 24 | 28 | 28 |
| 50 | 13 | 15 | 14 | 15 | 25 | 19 | 12 | 28 | 24 | 13 | 26 | 28 |
| 100 | 9 | 13 | 11 | 10 | 18 | 13 | 7 | 15 | 18 | 12 | 14 | 24 |

[1] Average film thickness about 1.1 mil.
[2] Sward hardness was recorded after 24 hours' storage at the indicated humidity.
[3] Brittleness tests were made by bending a tin plate on which the film had been dried over a ⅛-inch mandrel within 2 seconds. Any pattern at the bend as seen through a 6× magnifying glass was taken as an indication of brittleness.
[4] Dust-free time was determined by drawing a thread from a piece of cheesecloth slowly across the surface of the film. If the string moved jerkily, the film was not considered dust-free.
[5] Tack-free time was determined by rubbing a strip of paper into contact with the film surface and then pulling off the paper. If there was any audible evidence of adhesion when the two surfaces were separated, the film was not considered tack-free.

From Table I-B, it may be seen that film hardness of resins of a given oil length tends to be of the same order of magnitude irrespective of imide content, but with the lower oil contents the high acid numbers of non-imide alkyds make them unusable.

Table II gives the results of several film tests on various alkyd compositions which had been baked for 20 minutes at 83° C. (180° F.) with 0.01% Co drier. Changes in film hardness and brittleness are given over a period of 42 days' storage at fixed relative humidity.

rather drastic test, some of the resins which we have termed brittle would not show that characteristic in other types of tests.

As indicated in Table II, the tendency to brittleness is reduced without serious loss in hardness by replacing part of the phthalic anhydride with adipic acid or by blending brittle with non-brittle resins. The latter method is not of universal application, since some of the shorter oil imide resins are incompatible with medium oil alkyds which are suitable plasti-

*Table II.—Film tests,[1] low temperature bakes*

| | 35% SO 10% GP | 30% SO 12% GP | 30% SO 20% GP | 20% SO 25% GP | Blend A | Blend B | Blend C | 20% SO 25% GP 15% Adipic | Extn. Res.[2] | 40% LO |
|---|---|---|---|---|---|---|---|---|---|---|
| Acid No. | 9.2 | 14.3 | 5.6 | 10.1 | 9.0 | 5.8 | 6.4 | 6.6 | 5.4 | 8 |
| Sward Hardness: | | | | | | | | | | |
| Hot[3] | 9 | 14 | 15 | 32 | 13 | 12 | 12 | 6 | 14 | tacky |
| Cold[4] | 10 | | | | | 18 | 21 | 19 | 25 | 8 |
| Short-time storage 2-3 days: | | | | | | | | | | |
| 0% rel. hum. | 32 | 20 | 25 | 47 | 22 | 27 | 36 | 31 | 42 | 24 |
| 50% rel. hum. | 27 | 15 | 22 | 35 | 16 | 24 | 30 | 26 | 37 | 22 |
| 100% rel. hum. | 17 | 13 | 15 | 18 | 12 | 19 | 20 | 13 | 26 | 10 |
| Longer storage at indicated rel. hum.: 7 days: | | | | | | | | | | |
| 0% rel. hum. | | 32 | 36 | 56 | 38 | 37 | | | | |
| 50% rel. hum. | 40 | | | | | | 46 | 40 | 46 | 26 |
| 30 days: | | | | | | | | | | |
| 0% rel. hum. | | 53 | 53 | 63 | 51 | 51 | | | | |
| 50% rel. hum. | 44 | | | | | | 54 | 51 | 60 | 34 |
| 42 days: | | | | | | | | | | |
| 50% rel. hum. | 43 | | | | | | 52 | 51 | 60 | 36 |
| Brittleness:[5] | | | | | | | | | | |
| Cold[4] | no | no | no | yes | no | no | no | no | no | no |
| 2 days | no | yes | yes | yes | no | no | yes | no | no | no |
| 7 days | no | yes | yes | yes | yes | no | yes | yes | no | no |
| 42 days | no | yes | yes | yes | yes | yes | yes | yes | no | no |

[1] All experimental alkyds contain 5% excess glycerine basis finished resin. All films baked 20 minutes at 83° C. using 0.01% Co basis solids. "4% Glyceryl phthalimide" means 4% of the phthalic anhydride was replaced with an equivalent amount of glyceryl phthalimide. Average film thickness about 1.1 mil.
SO = soybean oil
GP = glyceryl phthalimide
LO = linseed oil
Blend A = 5 parts 20% soybean oil, 25% glyceryl phthalimide, 5 parts commercial 40% linseed oil alkyd.
Blend B = 9 parts 30% soybean oil, 20% glyceryl phthalimide, 1 part commercial 40% linseed oil alkyd.
Blend C = 7 parts 25% soybean oil, 10.7% glyceryl phthalimide, 3 parts commercial 40% linseed oil alkyd.
[2] Residue from the alcoholic extraction of a 40% soybean oil length alkyd.
[3] Hardness taken immediately after removal from the oven.
[4] Hardness taken when films had cooled to room temperature.
[5] Brittleness tests were made by bending a tin plate on which the film had been dried over a ⅛-inch mandrel within 2 seconds. Any pattern at the bend as seen through a 6× magnifying glass was taken as an indication of brittleness.

The brittleness test used in evaluating the films comprised bending the tin plate and film cizers. Sebacic acid has about the same effect as adipic acid in reducing brittleness.

Additional resins were made using glyceryl succinimide. Glyceryl succinimide was prepared from molar quantities of succinic acid and glyceryl amine at 165° C. in an atmosphere of nitrogen. The theoretical amount of water was obtained. The product was a viscous amber-colored liquid with a hydroxyl number of 599 compared to the theoretical 648, and the acid number was 1.6.

The use of glyceryl succinimide instead of glyceryl phthalimide in alkyd formulation resulted in a resin of characteristics similar to those obtained with the glyceryl phthalimide.

| Oil Length | Glyceryl Imide Used | Percent P. A. Subst. by Imide | Acid No. | OH No. Uncorrected | Sward Hardness Baked for 1 hr. at 150° C. | | |
|---|---|---|---|---|---|---|---|
| | | | | | 0% R. H. | 50% R. H. | 100% R. H. |
| *Percent* | | | | | | | |
| 30 | Succinimide | 13.2 | 15 | 70.2 | 56 | 54 | 39 |
| 30 | Pthalimide | 13.2 | 11.1 | 76.2 | 54 | 47 | 38 |

Although most of the resins in this study were made with the use of fatty acids rather than triglycerides because of convenience, it was found that both sources of fatty acid modifier can give satisfactory alkyds. For example, the oil can be alcoholized with glyceryl amine or other hydroxy material, after which the other ingredients can be added in the usual manner, but these resins tend to be dark. Also, after alcoholysis with glycerine, the phthalic anhydride, glyceryl amine and glycerine could be added, but this too gives dark resins and requires cooling at the time of mixing because of the violence of the reaction between phthalic anhydride and glyceryl amine at elevated temperatures. The preferred procedure is to alcoholize with glycerine according to standard practice, and then add glyceryl phthalimide, phthalic anhydride and glycerine.

Inhibitor-containing alkyds modified with linseed fatty acids were prepared from linseed oil as well as from linseed acids. These resins were not greatly different than those modified with soybean fatty acids.

The characteristics of the new alkyds are such that they are adapted to uses where ordinary alkyds are entirely unsuited. For example, new resins of very low acid and hydroxyl numbers and down to zero oil content can be made and are of potential usefulness in the plastics industry, since they are initially rather high-melting and give off only negligible amounts of water on further heating or polymerization. These alkyds are indicated for use in heat-sealing compositions because of their satisfactory melting point range, toughness, good adherence and flexibility in proper oil length.

As another example of the process, the amides of glyceryl monoamine (1-amino propanediol-2,3) were employed. These amides were prepared by dropping the amine into the equivalent amount of fatty acids maintained at about 220° C. in an atmosphere of nitrogen. An atmosphere of carbon dioxide leads to unsatisfactory results under these conditions. The amides are practically neutral waxy materials with hydroxyl contents corresponding to the expected structure R—CO—NHCH$_2$—CHOH—CH$_2$OH.

Alkyds prepared from fatty acid amides of glyceryl amine, phthalic anhydride and glycerine had greatly improved film characteristics in comparison with those of ordinary alkyds, and like the other inhibitor-containing alkyds showed the additional important advantage of retarded gelation during resin cooking, to the extent that resins of very low oil content and very low acid number could be produced.

It is believed that when a N-substituted amide is introduced into the reaction mass, a new reaction which we have termed amide interchange takes place and the basic nitrogen is ultimately transformed into an imide of the dibasic acid used. This reaction takes place according to the following equation in the presence of alcoholic hydroxyl groups:

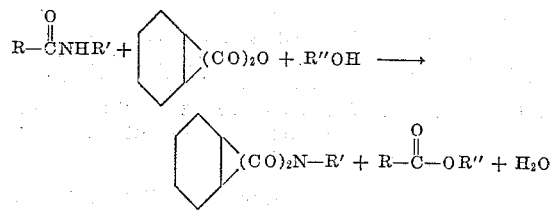

For example, we have found that n-butyl stearamide plus phthalic anhydride in the presence of a polyhydric alcohol gives a good yield of n-butyl phthalimide.

As examples of other inhibitors which may be used in carrying out the processes of this invention we have listed several compounds in the following table. This table describes some of the properties of resins which were made using these inhibitors. In each case there was added to 49.4 parts of glycerine, 94.3 parts of phthalic anhydride, and 57.4 parts of soy fatty acids the following amounts of inhibitors respectively:

21.4 parts glyceryl phthalimide, or
21.2 parts glyceryl alpha-(beta-naphthyl) ether, or 7.3 parts propylene glycol, or
16.0 parts glyceryl alpha-phenyl ether, or
19.4 parts glyceryl alpha-p-chlorophenyl ether, or
19.4 parts glyceryl alpha-o-chlorophenyl ether.

| | Acid No. | Uncorrected OH Number | Sward Hardness, 1 hr. baked at 150° C. | | |
|---|---|---|---|---|---|
| | | | 0% RH | 50% RH | 100% RH |
| Glyceryl phthalimide | 11.1 | 97 | 54 | 47 | 38 |
| Glyceryl alpha (beta naphthyl) ether | 10.8 | 89 | 34 | 32 | 23 |
| Propylene glycol | 12.1 | 94 | 40 | 31 | 20 |
| Glyceryl alpha phenyl ether | 13.5 | 90 | 41 | 30 | 20 |
| Glyceryl-alpha-p-chlorophenyl ether | 9.2 | 96 | 44 | 33 | 25 |
| Glyceryl-alpha-o-chlorophenyl ether | 11.8 | 93 | 46 | 34 | 26 |

The reaction of glyceryl amine with rosin gives an ester-amide which is substantially higher melting than ester gum.

It has already been pointed out that the invention is of particular value in the preparation of pentaerythritol alkyd resins. The following examples show the improvement in pentaerythritol resins produced by the use of the invention.

Pentaerythritol resins of 40 and 50% oil length were prepared unmodified and also with glyceryl-phthalimide. These resins were investigated to determine the effect of glyceryl phthalimide on hardness and acid number. The data are summarized in the following table.

|  | Uncorrected OH Number | Acid No. | Sward Hardness, 1 hr. baked at 150° C. | | | |
|---|---|---|---|---|---|---|
|  |  |  | 0% RH | 50% RH | 100% RH | Brittle |
| 40% oil. All glycerine subst. by P. E. 5% excess OH's | 87.4 | 51.9 | 59 | 52 | 46 | No |
| 40% oil. All glycerine subst. by P. E. 23.3% P. A. subst. by glyc. phthalimide 5% excess OH's | 77.7 | 19.7 | 56 | 40 | 25 | No |
| 50% oil. All glyc. subst. by P. E. 5% excess OH's | 53.8 | 33.6 | 56 | 48 | 25 | No |
| 50% oil. All glyc. subst. by P. E. 13.5% P. A. subst. by glyc. phthalimide 5% excess OH's | 71.8 | 9.1 | 45 | 37 | 27 | No |

Glyceryl phthalimide has a very marked effect on the acid number of pentaerythritol resins. Heretofore the resins gelled before a low acid number could be attained due to the four primary hydroxyls in the alcohol. The addition of the imide makes possible the reduction of the acid to the desired value without danger of gelation.

The second example in the preceding table was formulated so as to give an acid number of 13.7 according to the method of calculation described later in this specification. The observed value of 19.7, which is in reasonably good agreement with the theoretical value considering the type of resin, could of course have been reduced further by using a larger percentage of glyceryl phthalimide.

As heretofore explained, it is believed that the use of the inhibitors has an effect in reducing cross linkage. This theory is borne out by the evidence already presented and further has been checked by application of a method of calculation based on a theory which predicts the acid number of the finished product.

Given the fatty acid and excess hydroxyl content, the calculation directs the preparation of a resin by showing the amount of inhibitor compound which must be used to reduce the acid number to the desired value.

In explaining the results found, and as a basis for predicting the results in other compositions, equations were derived based upon certain assumptions as follows: It is assumed that alkyd polymerization in the kettle is predominantly linear, and that the functionality of all polymerizing constituents may be considered as two in the finished resin. Any constituent such as glycerine which has a potential functionality of more than two is assumed not to use more than two functional groups to any great extent.

Taking the standard glycerine—phthalic anhydride—fatty acid alkyd as an example, it is seen that glycerine is the only ingredient having a functionality greater than two. There are three methods by which the functionality of the glycerine may be reduced to two so that the resin is substantially a linear polymer.

1. Fatty acids in combination with glycerine reduce its functionality to two or even to one by the formation of mono- or diglycerides.
2. In a similar way, phthalic anhydride which reacts only partially with glycerine reduces the functionality of glycerine. Since this type of action leaves unreacted carboxyl groups which show up as the acid number of the resin, it may be said for the sake of simplicity that control of acid number affects the functionality of glycerine.
3. Excess hydroxyl groups in an alkyd constitute the third method of reducing the functionality of glycerine. If there is for example, one mole of free glycerine in a resin, there are three equivalents of free hydroxyl groups. This excess glycerine is not present as such, but is probably made up of one free hydroxyl group from each of three glycerine residues. Therefore, one mole equivalent of free glycerine in a resin will render three moles of glycerine di-reactive. This method of reducing the functionality of glycerine, which means controlling the gelation of alkyds in the kettle, is one of the most important, and can be easily expressed in terms of the hydroxyl number of the resin.

It is assumed that the only reaction occurring in the resin kettle, except possible amide interchange, is esterification. This is believed to be substantially true.

In the case of a tetrafunctional material like pentaerythritol, it is assumed that when free hydroxyl groups are present, there are two of them on each pentaerythritol residue. Thus one mol equivalent of pentaerythritol is capable of rendering only two moles of pentaerythritol di-reactive.

All resins were cooked to a cure time of about 20 seconds on a Thermoelectric Company hot plate at 200° C., which is believed to be as close to the gel point of the resin as is practical. Since methods of calculating the formulas of regular alkyds are not standardized, the calculation procedure will be carried through from the beginning. Repeated checks of the method on laboratory batches of resin have resulted in remarkably close agreement of theory and practice. The procedure assumes no loss of phthalic anhydride or other ingredient from the kettle during cooking.

In the following paragraphs, the identity of numbers otherwise unidentified is as follows:

$92 =$ mol. wt. glycerine
$136 =$ mol. wt. pentaerythritol
$280 =$ av. mol. wt. soybean oil fatty acids
$56,108 =$ mg. per mol. KOH
$221 =$ mol. wt. glyceryl phthalimide Percent oil (oil length) $= 100 -$ percent alcohol phthalate.

Percent alcohol phthalate=percent phthalic anhydride desired times $\dfrac{\text{M. W. phthalate}}{\text{M. W. phthalic anhydride}}$ For glycerine, the latter factor=1.29.

To make $x$ grams of resin containing $y$ percent excess alcohol based on the weight of the finished product, calculated as follows:

Grams phthalic anhydride=

$$\dfrac{\text{percent phthalic anhydride}\cdot x}{100}$$

Grams fatty acid=percent oil·$x$·percent fatty acid in ester. (Percent fatty acid in ester=95.7 for glycerine. If oil is used to make the resin, simply take $\dfrac{\text{percent oil}\cdot x}{100}$)

Grams alcohol=

$$\dfrac{\text{mg. KOH equivalent to acid groups}}{\text{hydroxyl number of alcohol}}+(x\cdot y)$$

To predict the acid number of a resin from its formula, the assumptions regarding the substantially linear structure of alkyds and the methods by which glycerine is rendered difunctional are carried out as follows. Specific examples will be given in order to clarify the explanation.

An alkyd of 40% oil length containing the equivalent of 5% excess glycerine based on the entire resin can be made from the following ingredients:

76.5 g. soy fatty acids
93.0 g. phthalic anhydride
58.2 g. glycerine
Weight of finished resin, 210 g.

The fatty acids would render $$\dfrac{76.5\cdot 92}{280}=25 \text{ g. glycerine direactive}$$

The 10 g. excess glycerine would render 10·3=30 g. glycerine direactive.

This leaves 58.2−(25+30)=3.2 g. tri-reactive glycerine which must be made di-reactive by forming a half-ester of phthalic anhydride, leaving an equivalent amount of free acid groups, which will be responsible for the acid number of the resin. In this case, the predicted acid number is $$\dfrac{3.2\cdot 56108}{92\times 210}=9.2$$

In an experimental batch using the above formula, the acid number obtained was 10.8.

Taking another example, the procedure will be applied to a pentaerythritol resin, and it will be shown how to calculate the amount of glyceryl phthalimide necessary to reduce the acid number to the desired value.

A 50% oil alkyd with pentaerythritol as the only alcohol, and containing 5% excess pentaerythritol on the basis of the finished resin, can be made from the following ingredients:

94.6 g. soy fatty acids
75.0 g. phthalic anhydride
57.0 g. pentaerythritol
Weight of finished resin, 211 g.

The fatty acids would render $$\dfrac{94.6\times 136}{2\times 280}=22.9 \text{ g. pentaerythritol direactive}$$

The 10.55 g. excess P. E. would render $$10.55\times 2=21.1 \text{ g. pentaerythritol direactive}$$

This leaves 57−(22.9+21.1)=13 g. tetrareactive pentaerythritol, which must be made direactive by forming a half-ester of phthalic anhydride. The predicted acid number of this resin is $$\dfrac{13\times 2\times 56108}{136\times 211}=46.5$$

In an experimental batch using the above formula, the acid number obtained was 33.6.

If it is desired to reduce the acid number of the above formula to 10 by replacing part of the phthalic anhydride with glyceryl phthalimide, the formula is revised in accordance with the following calculation. An acid number of 10 would allow the presence of $$\dfrac{136\times 10\times 211}{2\times 56108}=2.5 \text{ g. tetrareactive pentaerythritol}$$

Therefore in the above formula 13−2.5=10.5 pentaerythritol must be replaced with $$\dfrac{221\times 10.5}{136}=17.1 \text{ g. glyceryl phthalimide}$$

which in turn would replace $$\dfrac{17.1\times 148}{221}=11.45 \text{ g. phthalic anhydride}$$

The formula for the new batch of predicted acid number 10 would then be 94.6 g. soy fatty acids
63.55 g. phthalic anhydride
46.5 g. pentaerythritol
17.1 g. glyceryl phthalimide.

In an experimental batch using the above formula, the acid number obtained was 9.1.

In the following example, it will be shown how to calculate the amount of glyceryl phthalimide necessary to reduce the acid number of a 30% oil glyceryl phthalate alkyd to the desired value.

A 30% oil alkyd containing 5% excess glycerine on the basis of the finished resin can be made from the following ingredients:

57.4 g. soybean fatty acids
108.4 g. phthalic anhydride
61.1 g. glycerine
Weight of finished resin, 210 g.

The fatty acids would render $$\dfrac{57.4\cdot 92}{280}=18.9 \text{ g. glycerine direactive}$$

The 10 g. excess glycerine would render 10·3=30 g. glycerine direactive.

This leaves 61.1−(18.9+30)=12.2 g. tri-reactive glycerine, which must be made direactive by forming a half-ester of phthalic anhydride. The predicted acid number of this resin is $$\dfrac{12.2\cdot 56108}{92\cdot 210}=35.5$$

In an experimental batch using the above formula, the acid number obtained was 32.7.

If it is desired to reduce the acid number of the above formula to 10 by replacing part of the phthalic anhydride with glyceryl phthalimide, the formula is revised in accordance with the following calculation. An acid number of 10 would allow the presence of $$\dfrac{92\cdot 10\cdot 210}{56108}=3.4 \text{ g. trireactive glycerine}$$

Therefore in the above formula 12.2−3.4=8.8 g. glycerine must be replaced with $$\frac{221 \cdot 8.8}{92} = 21.2 \text{ g. glyceryl phthalimide}$$

which in turn would replace $$\frac{21.2 \cdot 148}{221} = 14.2 \text{ g. phthalic anhydride}$$

Since the 8.8 g. of tri-reactive glycerine is being replaced with tetra-reactive glyceryl amine, it is necessary in calculating the new formula actually to deduct 4/3×8.8=11.7 g. glycerine in order to maintain approximately the same hydroxyl number. The formula for the new batch of predicted acid number 10 would then be:

57.4 g. soybean fatty acids
94.2 g. phthalic anhydride
49.4 g. glycerine
21.2 g. glyceryl phthalimide In an experimental batch using the above formula, the acid number obtained was 11.6.

Additional examples of the correlation between predicted and observed acid numbers using the method of calculation described are given in Table I-A as Acid Numbers Calculated. Finished batches of resin in all cases weighed 210 g. The calculations were made according to the following formulas:

(a) For resins not modified with glyceryl phthalimide:

$$\text{Acid number} = \frac{\left[\text{wt. Gly.} - \left(\frac{\text{wt. fatty acids} \cdot \text{mol wt. gly.}}{\text{Mol. wt. fatty acids}} + 3 \cdot \text{wt. excess gly.}\right)\right] \text{mg. KOH per mol}}{\text{mol. wt. gly.} \cdot \text{wt. finished resin}}$$

$$= 2.91 [\text{wt. glycerine} - ((0.329 \cdot \text{wt. fatty acids}) + 30)]$$

(b) For resins modified with glyceryl phthalimide:

$$\text{Acid number} = \text{Calcd. acid No. of unmodified resin} - \left(\frac{\text{wt. glyceryl phthalimide used} \cdot \text{mg. KOH per mol}}{\text{Mol. wt. glyceryl phthalimide} \cdot \text{wt. finished resin}}\right)$$

$$= \text{Calcd. acid No. of unmodified resin} - (1.21 \cdot \text{wt glyceryl phthalimide used})$$

The method of calculation and the theory outlined above can readily be adapted to types of alkyds other than those specifically mentioned as well as to mixtures.

Aliphatic dibasic acids such as adipic and sebacic may also be used, particularly in substitution for part of the phthalic anhydride. Similarly maleic and fumaric acids may be employed.

The inhibitor-containing alkyd resins are most remarkable because of their unique combination of properties. For the first time an alkyd is made available with an acid number below 15, and even below 10, which forms films which are non-brittle and yet have a hardness comparable to that of the best alkyd resins heretofore obtainable. These new resin films can be dried so rapidly through the tacky stage as to permit air drying of the resin in one hour or less. Such films are made available for air drying assembly lines. For example, a 30% oil length alkyd resin having 13.2% of phthalic anhydride substituted with glyceryl phthalimide in xylene solution and ground with titanium dioxide to produce a white enamel, dried to a Sward hardness of 12 in one hour under 50% relative humidity. A standard "Glyptal" 2452 resin similarly treated with titanium dioxide was still tacky at the end of one hour and had a hardness of only 10 after 72 hours. The same imide substituted resin air dried under 0% relative humidity, had a hardness of 20 at the end of one hour, while the "Glyptal" resin was still tacky. At the end of 72 hours under these conditions the "Glyptal" resin still had a hardness of only 16.

As is well known in the art, it is difficult and sometimes impossible to duplicate film hardness readings with a given resin preparation on successive days even under rigidly controlled conditions. Atmospheric conditions including temperature and relative humidity have some bearing on results of hardness tests. Therefore we do not wish to be bound by the numerical film hardness data given under the heading "Sward Hardness," in this specification, or the relationships between resins implied therein, but only by the wording of the following claim.

We claim:

A short oil alkyd resin having an acid number below 15 and being capable of acting as the sole film-forming constituent in a surface coating composition, comprising essentially the reaction product of 20 to 40 mole per cent of glycerine, 40 to 45 mole per cent of phthalic anhydride, 10 to 20 mole per cent of a vegetable oil fatty acid, and between 5 and 15 mole per cent of glyceryl monophthalimide, wherein the fatty acid plus the glyceryl monophthalimide comprises approximately 20 to 25 mole per cent of the reaction mixture.

ROBERT N. DU PUIS.
HOWARD J. WRIGHT.

REFERENCES CITED

The following references are of record in the file of this patent:

UNITED STATES PATENTS

| Number | Name | Date |
|---|---|---|
| 1,843,870 | Ellis | Feb. 2, 1932 |
| 1,872,568 | Ellis | Aug. 16, 1932 |
| 1,918,222 | Weisberg et al. | July 11, 1933 |
| 1,958,614 | Ellis | May 15, 1934 |
| 2,009,432 | Brubaker et al. | July 30, 1935 |
| 2,048,778 | Brubaker et al. | July 28, 1936 |
| 2,050,263 | Borglin | Aug. 11, 1936 |
| 2,056,656 | Ellis | Oct. 6, 1936 |
| 2,182,178 | Pinkernelle | Dec. 5, 1939 |

FOREIGN PATENTS

| Number | Country | Date |
|---|---|---|
| 305,965 | Great Britain | Feb. 11, 1929 |
| 376,929 | Great Britain | July 21, 1932 |
| 378,596 | Great Britain | Aug. 18, 1932 |